United States Patent [15] 3,664,029
Glucoft et al. [45] May 23, 1972

[54] DIAL INDICATOR HOLDER

[72] Inventors: Harold Glucoft, 1351 Sunset Ave, Santa Monica, Calif. 90405; James Westerfield, 19 N. Margerita, Apt. #15, Alhambra, Calif. 91803

[22] Filed: Feb. 2, 1970

[21] Appl. No.: 7,712

[52] U.S. Cl. ...............................33/180 R, 33/84, 248/231
[51] Int. Cl. ..........................................................G01b 5/14
[58] Field of Search............33/84, 180 R, 180 AT; 248/231, 248/DIG. 4; 269/131

[56] References Cited

UNITED STATES PATENTS

| | | | |
|---|---|---|---|
| 2,634,939 | 4/1953 | Voss | 33/84 X |
| 1,848,527 | 3/1932 | Hickey | 33/180 R UX |
| 2,499,753 | 3/1950 | Hubbard | 248/231 X |
| 3,244,392 | 4/1966 | Sheets | 248/231 |
| 3,525,158 | 8/1970 | Torlay | 33/84 X |

Primary Examiner—William D. Martin, Jr.
Attorney—David J. Galvin and Jay M. Cantor

[57] ABSTRACT

An easily attachable shaft aligning apparatus comprises a gauge carrying head member having a pair of angularly related arms which make contact with a shaft or axle to be aligned with a second shaft or axle. A belt or chain extends about the shaft or axle and has one end adjustably supported on one arm, the other arm being provided with a linked extension which also contacts the shaft and is provided with an outward projection for passing through a link in the chain or an opening in the belt, whereby when the chain is tightened by the adjustment the head member is securely held to the shaft or axle.

11 Claims, 4 Drawing Figures

Patented May 23, 1972

INVENTORS.
HAROLD GLUCOFT,
JAMES WESTERFIELD

BY David J Galvin

ATTORNEY

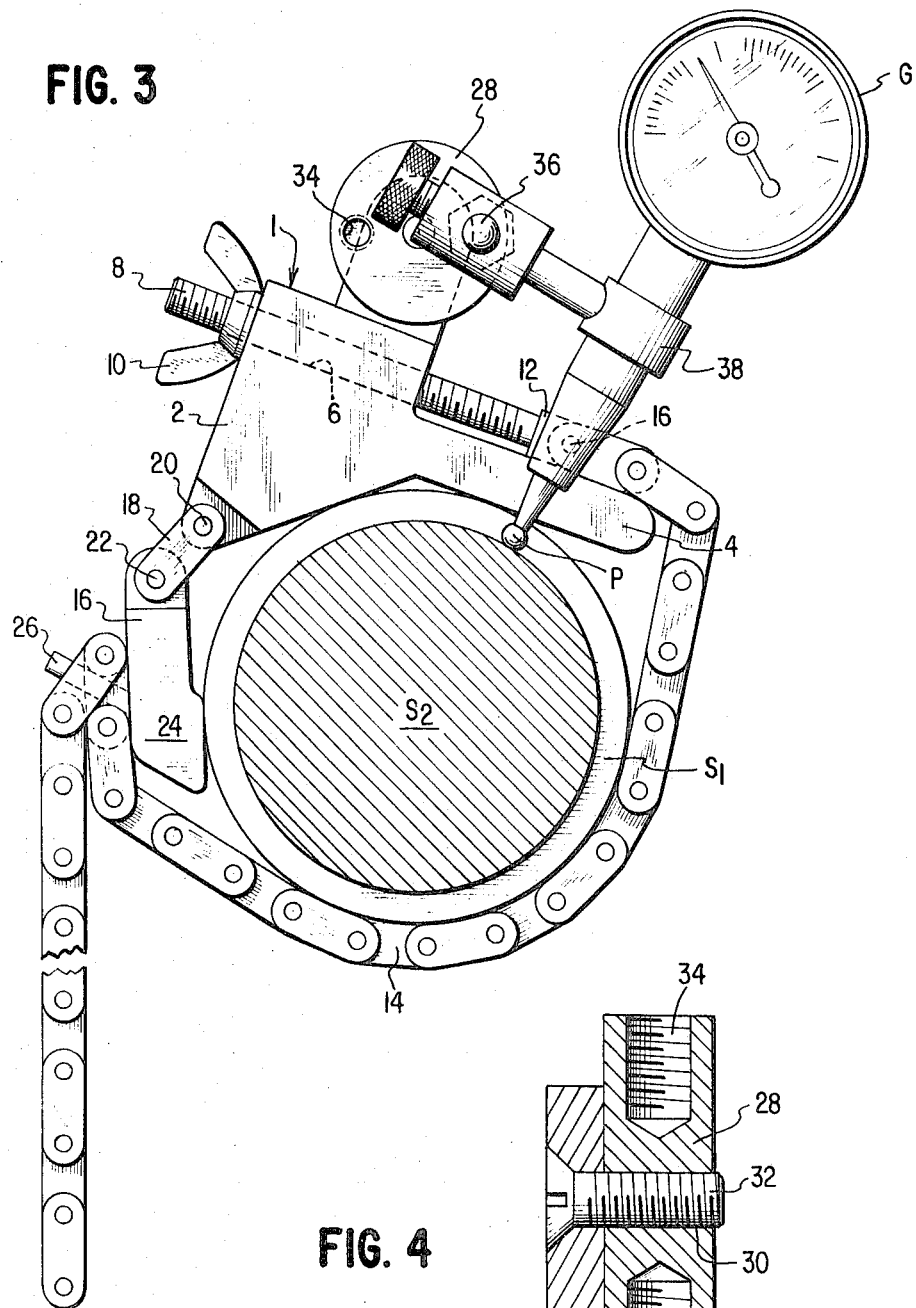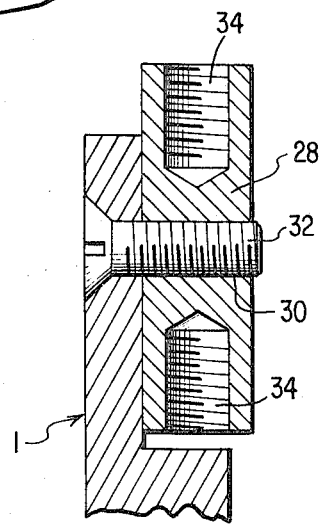

DIAL INDICATOR HOLDER

The present invention relates to an improvement in shaft or axle aligning devices. The invention is in some respects similar to the prior art devices in that it comprises, in common with the prior art, a head member which supports a dial indicator and is secured to the periphery of a rotatable shaft for rotation therewith, by a flexible element or chain. By rotating the shaft supporting the dial indicator thereon with the feeler element of the latter in contact with the periphery or aquared end of a second shaft or axle, the dial indicator will indicate any axial misalignment of the two shafts or lack of parallelism. The relative positions of the shafts can then be adjusted until the gauge indicates that the axes of the shafts are in axial alignment or paralle. The prior art devices however, suffer from the disadvantages of being too cumbersome, too complicated, awkward to operate and limited in the range of shaft sizes with which they may be used. With our invention, as hereinafter described, these disadvantages are obviated without increasing the cost of manufacture while at the same time providing a device which is easier to attach and detach and which can be used with a greater range of shaft sizes.

It is therefore an object of this invention to provide a shaft aligning device which is easier to attach and detach from a shaft or axle.

It is a further object of this invention to provide a shaft or axle aligning device which can be utilized on shafts over an extremely large range of diameters.

It is a still further object of the invention to provice a shaft aligning device which is uncomplicated, economical to manufacture yet rugged and sturdy in use.

The shaft aligning device of our invention comprises in general, a head member on which one or a pair of dial indicators each provided with a feeler may be mounted, in such positions, that one feeler may contact the periphery of a second shaft or axle while the other may contact the squared end thereof or the face of a flange mounted thereon. The head or indicator supporting member of this invention includes a pair of angularly related arms which make contact with a shaft between them. One of the arms is provided with a linked extension which also contacts the shaft or axle on which the head member is supported. To secure the head member on the shaft for rotation therewith, a belt or chain has one end linked to a movable member which is adjustable along the other arm. After passing the belt or chain about the shaft, it is hooked onto an outward projection on the linked extension. The movable member is then adjusted to cause the belt or chain to force the arms tightly against the shaft or axle to enable the indicator supporting member to rotate therewith without slippage.

The details of a preferred embodiment of the invention are more fully set forth below with reference to the drawing in which:

FIG. 3 is an end view of the aligning device mounted on a shaft; and

FIG. 4 shows the gauge or dial indicator support member in cross-section along line 4—4 of FIG. 1.

Figures 1, 2:
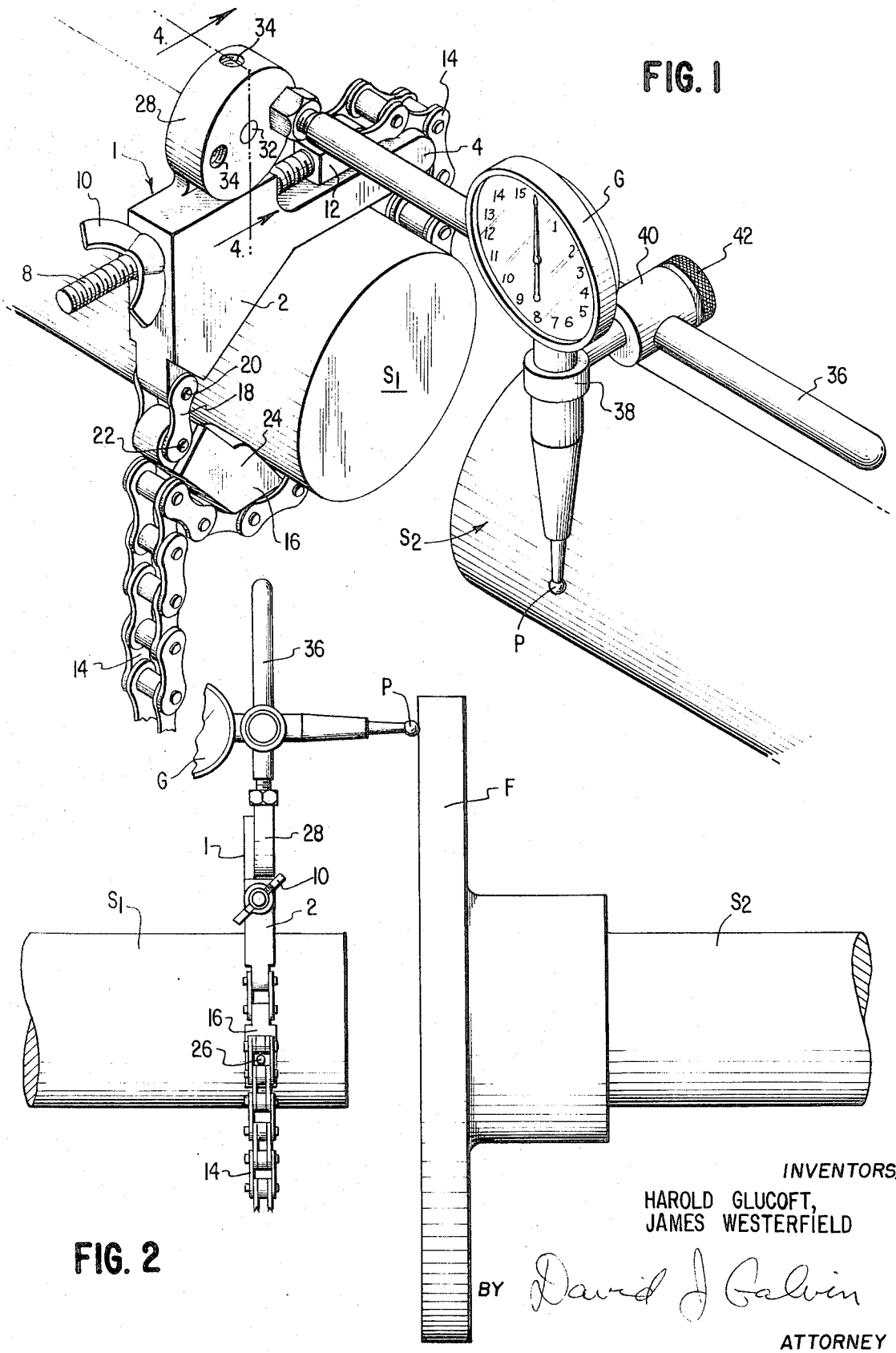
FIG. 1 is a perspective view of the shaft aligning device of the invention mounted on a shaft for testing axial misalignment with a second shaft.
FIG. 2 is a side view of the aligning device for testing parallelism between the axes of two shafts.

The head member 1 as shown in FIGS. 1 and 3, is comprised of a block of material shaped to provide a pair of angularly related arms 2 and 4. These arms preferably make an obtuse angle between them and have straight, smooth, flat inner surfaces for contacting the periphery of a shaft or axle. The arm 2 is provided with a built-out portion extending beyond the plane of the outer surface of arm 4 and is provided with a smooth bore 6 therethrough parallel to the arm 4 and in a plane thereabove. A threaded bolt 8 is mounted for smooth sliding movement within the bore and is provided with a wing nut 10 threaded thereon at the end projecting outwardly from the extended portion of arm 2. At its other end the bolt supports an enlarged block 12 which may, if desired, rest for sliding movement on the outer surface of arm 4, which is flat and smooth to minimize friction. However, the block may be supported only by the bolt.

As shown on the drawings, a roller chain 14 is linked at one end to the block 12 at 16. While a roller chain of the type used for driving a sprocket is depicted, it is obvious that other types of chains or even a flexible belt may be utilized instead, for the same purpose. The arm 2 is provided at its free outer end with an extension 16 having a smooth, flat inner surface capable of contacting the periphery of a shaft upon which the head member is to be mounted. To this end, the free end of arm 2 is provided with a link 18 pivoted at 20 to the extreme outer end thereof for pivotal movement toward the shaft $S_1$ in the plane of the arm. The movable shaft contact member 16 is pivoted to the other end of link 18 at 22 also for movement toward the shaft $S_1$ in the plane of the arm 2. As can be seen from the drawings, the length of link 18 together with the length of member 16 is such, that the end portion of the latter can touch the inside surface of arm 4 close to the apex of the angle with no shaft between the arms. The free end portion of the linked shaft contact member or arm 16 is provided with a flat, smooth inner surface 24 for contacting a shaft at a third point. Because of the length of arm 16 including its connection even a relatively small diameter shaft, such as about one-fourth of an inch, may have the aligning device secured thereon. The linked extension 16 is further provided with a projecting peg or pin 26 which extends at such an angle to the outer surface of the linked extension that it will support the chain when a link thereof is passed over it. As can be seen from the drawing, when the dial indicator supporting head 1 is seated with its arms 2 and 4 on the periphery of a shaft such as $S_1$ and the arm 16 moved into contact therewith, the chain or other flexible member is wrapped about the shaft tightly and the closest link of the chain passed over the pin 26. The wing nut 10 is then rotated until the head member 1 is seated securely on the shaft for rotation therewith.

It is obvious that the pin or hook member 26 can be mounted on the block 12 instead and the end of the chain permanently attached to the arm 16. As another modification, both the arm 16 and block 12 may each have a pin or hook thereon for detachably supporting the chain. In this way various lengths of chains may be used depending on the shaft size.

Mounted on the built-out or enlarged portion of the arm 2, is a disk 28 having an axially extending threaded bore 30 therethrough. A screw 32 extends through the enlarged portion of the head and is threaded into the bore 30 for holding the disk tightly against the head to prevent free movement thereof. The disk is provided with threaded recesses 34 both in its periphery and in its face. These recesses are provided for the purpose of receiving the threaded end of a rod 36 which supports a dial indicator or feeler gauge G having a feeler P for contacting a second shaft $S_2$ or a flange F thereon as shown in FIG. 2. The dial indicator may be frictionally held for rotation in a collar 38 mounted on or integral with a block 40 slidable on rod 36 and secured thereon by a knurled screw. After threading the rod 36 into a recess 34 in the disk, the screw 32 may be loosened to position the feeler against shaft $S_2$ or the face of flange F and to then lock the disk. The dial indicator or gauge can then be turned in its collar so that its pointer can be observed during the aligning operation.

It should be noted also that, although FIG. 1 shows a dial indicator mounted for testing axial misalignment and FIG. 2 shows a dial indicator mounted for testing angularalignment or parallelism between the axes of two shafts, these two testing operations can be performed simultaneously with the device hereinabove described. This is easily done by mounting a dial indicator on the periphery of the disk in FIG. 1 as shown in FIG. 2.

The invention has particular utility because of the large range of shaft diameters on which it can be mounted. Also, by its simple and uncomplicated structure, it can easily be mounted and removed by an unskilled person.

Having thus fully described our invention with all the particularity required by law and the best mode of operating and using it, what we particularly point out and distinctly claim as our invention is:

1. A shaft aligning apparatus comprising, a head member for supporting a feeler gauge and including a first and second arm angularly related for contacting the surface of a shaft at a pair of spaced points thereon, means movably linking a third arm to one of the first and second arms for contacting the shaft at a third point, the length of the linking means and third arm being substantially that of the one arm, a flexible member for extending about the periphery of the shaft between the third arm and the head member, means on the third arm and head member for supporting the flexible member between them, one of said supporting means being relatively movably mounted, means for adjusting the movable supporting means for tightening the flexible member about the shaft.

2. A shaft aligning device according to claim 1 in which one of the supporting means detachably supports the flexible member.

3. A shaft aligning device in accordance with claim 2 in which the flexible member is provided with a plurality of openings and the means for detachably supporting the flexible member comprises a pin for entering a selected opening in the flexible member.

4. A shaft aligning apparatus comprising, a head member for supporting a feeler gauge and including first and second arms angularly related for contacting the surface of a shaft at a pair of spaced points thereon, a third arm for contacing the shaft at a third point and having a connection to the second arm, a flexible member for extending about the periphery of the shaft between the third arm and the head member, means on the third arm and head member for supporting the flexible member between them, one of said supporting means being relatively movably mounted and means for adjusting the movable supporting means for tightening the flexible member about the shaft, the movable supporting means comprising means slidably mounted for movement parallel to the first arm and in a plane normal to the axis of the shaft.

5. A shaft aligning apparatus comprising a head member for supporting a feeler gauge and including first and second arms angularly related for contacting the surface of a shaft at a pair of spaced points thereon, a third arm for contacting the shaft at a third point and having a connection to the second arm, a flexible member for extending about the periphery of the shaft between the third arm and the head member, means on the third arm and head member for supporting the flexible member between them, one of said supporting means being relatively movably mounted and means for adjusting the movable supporting means for tightening the flexible member about the shaft, the movable supporting means comprising means slidably mounted in the head member for movement parallel to the first arm and in a plane normal to the shaft axis.

6. A shaft aligning device according to claim 5 in which the movable supporting means is slidable along the first arm in a plane normal to the axis of the shaft.

7. A shaft aligning device in accordance with claim 4 in which the third arm including the connection, is of a length to enable the free end portion thereof to contact the inner surface of the first arm adjacent the apex of the angle in the absence of a shaft therebetween.

8. A shaft aligning apparatus comprising a head member for supporting a feeler gauge and including first and second arms angularly related for contacting the surface of a shaft at a pair of spaced points thereon, a third arm for contacting the shaft at a third point and having a connection to the second arm, a flexible member for extending about the periphery of the shaft between the third arm and the head member, means on the third arm and head member for supporting the flexible member between them, one of said supporting means being relatively movably mounted and means for adjusting the movable supporting means for tightening the flexible member about the shaft, a gauge holder, means supporting the holder for movement on the head member, said holder being provided with a plurality of spaced means for selectively supporting at least one gauge.

9. A shaft aligning device in accordance with claim 7 in which the holder is a rotatably mounted disk.

10. A shaft aligning apparatus comprising a head member for supporting a gauge and including a pair of angularly related arms for seating on a shaft, a third arm linked to one of said pair of arms for movement toward the shaft, an adjusting member mounted for movement parallel to the other of the pair of arms, a flexible member for extending about the shaft between the third arm, over the free end of the other of the pair of arms and the adjusting member, means for attaching the flexible member to the third arm and adjusting member, and means for moving the adjusting member to secure the head member to the shaft by tightening the flexible member thereabout.

11. A shaft aligning apparatus comprising a head member for supporting a gauge and including a pair of angularly related arms for seating on a shaft, a third arm linked to one of said pair of arms for movement toward the shaft, an adjusting member mounted for movement parallel to the other of the pair of arms, a flexible member for extending about the shaft between the third arm, over the free end of the other of the pair of arms and the adjusting member, member for attaching the flexible member to the third arm and adjusting member, and means for moving the adjusting member to secure the head member to the shaft by tightening the flexible member thereabout, the adjustable member being mounted on the head member and movable parallel to the other of the pair of arms in a plane normal to the axis of a shaft on which the head is seated.

* * * * *